(12) United States Patent
Nieschwitz et al.

(10) Patent No.: US 11,903,553 B2
(45) Date of Patent: Feb. 20, 2024

(54) VACUUM HOSE HAVING AN INTEGRATED SWITCH

(71) Applicant: H-P Products, Inc., Louisville, OH (US)

(72) Inventors: Darrell V. Nieschwitz, Louisville, OH (US); Greg A Calderone, Canton, OH (US); Shawn C. Metz, Louisville, OH (US)

(73) Assignee: H-P PRODUCTS, INC., Louisville, OH (US)

( * ) Notice: Subject to any disclaimer, the term of this patent is extended or adjusted under 35 U.S.C. 154(b) by 0 days.

(21) Appl. No.: 17/508,301

(22) Filed: Oct. 22, 2021

(65) Prior Publication Data

US 2022/0039624 A1 Feb. 10, 2022

Related U.S. Application Data

(63) Continuation-in-part of application No. 16/806,543, filed on Mar. 2, 2020, now Pat. No. 11,534,044,
(Continued)

(51) Int. Cl.
*A47L 9/28* (2006.01)
*A47L 9/24* (2006.01)
(Continued)

(52) U.S. Cl.
CPC ............... *A47L 9/2857* (2013.01); *A47L 5/38* (2013.01); *A47L 9/02* (2013.01); *A47L 9/242* (2013.01);
(Continued)

(58) Field of Classification Search
CPC .......... A47L 9/2857; A47L 9/02; A47L 9/242; A47L 9/248; A47L 9/2868; A47L 9/2894; A47L 9/2842; H02N 2/00; H02N 2/18
See application file for complete search history.

(56) References Cited

U.S. PATENT DOCUMENTS 2,701,103 A 10/1950 Coleman
2,943,698 A 7/1960 Bishop
(Continued)

FOREIGN PATENT DOCUMENTS

DE 102018108474 A1 * 10/2019 ........... A47L 9/2857
WO WO-2014056087 A1 * 4/2014 ............. B65D 90/00

OTHER PUBLICATIONS

DE102018108474A1 (Heiner Kühn; Marcel De Marco) published on Oct. 10, 2019 Translation retrieved from Google Patents https://patents.google.com/patent/DE102018108474A1/en?oq=DE102018108474A1 (Year: 2019).*

*Primary Examiner* — Steven M Cernoch
*Assistant Examiner* — Christopher Soto
(74) *Attorney, Agent, or Firm* — Sand, Sebolt & Wernow Co., LPA

(57) ABSTRACT

A vacuum hose has a switch that allows an operator to selectively send control signals to a transceiver to control the operation of a central vacuum unit. The switch may be located on a cuff or nozzle defining a distal end of the vacuum hose. The switch is not located on a head unit that couples to the cuff or nozzle and not located on a wall-mounted valve. The switch can be an energy harvesting switch that requires no batteries or no dedicated power source (i.e., not hardwired).

13 Claims, 8 Drawing Sheets

Related U.S. Application Data which is a continuation-in-part of application No. 16/580,165, filed on Sep. 24, 2019, now Pat. No. 11,484,165.

(60) Provisional application No. 62/813,278, filed on Mar. 4, 2019, provisional application No. 62/756,140, filed on Nov. 6, 2018.

(51) Int. Cl.
*H02N 2/00* (2006.01)
*A47L 9/02* (2006.01)
*A47L 5/38* (2006.01)

(52) U.S. Cl.
CPC ............. *A47L 9/248* (2013.01); *A47L 9/2868* (2013.01); *A47L 9/2894* (2013.01); *H02N 2/00* (2013.01)

(56) References Cited

U.S. PATENT DOCUMENTS

| | | | |
|---|---|---|---|
| 2,953,806 A | 9/1960 | Walker | |
| 3,173,164 A | 3/1965 | Congdon | |
| 3,520,725 A | 7/1970 | Hamrick | |
| 3,565,103 A | 2/1971 | Maselek et al. | |
| 3,672,630 A | 6/1972 | Naumburg et al. | |
| 4,336,427 A | 6/1982 | Lindsay | |
| 4,688,596 A | 8/1987 | Liebmann et al. | |
| 5,263,502 A | 11/1993 | Dick | |
| 5,507,067 A * | 4/1996 | Hoekstra | A47L 9/2857 15/319 |
| 5,535,784 A | 7/1996 | Saville et al. | |
| 5,914,816 A | 6/1999 | Soto et al. | |
| 6,459,056 B1 | 10/2002 | Graham | |
| 6,720,512 B1 * | 4/2004 | Rothbauer | H02G 3/14 200/333 |
| 7,010,829 B2 | 3/2006 | Harman et al. | |
| 7,624,472 B2 | 12/2009 | Ambrose | |
| 8,001,650 B2 | 8/2011 | Trotter | |
| 8,400,258 B2 * | 3/2013 | Aikens | H05B 47/19 340/3.7 |
| 9,717,381 B2 * | 8/2017 | Harman | A47L 9/244 |
| 9,993,126 B2 | 6/2018 | Harman | |
| 10,405,713 B1 | 9/2019 | Coltrin et al. | |
| 10,973,382 B2 | 4/2021 | Nieschwitz et al. | |
| 11,019,967 B2 | 6/2021 | Nieschwitz et al. | |
| 11,096,534 B2 | 8/2021 | Nieschwitz et al. | |
| 2006/0174441 A1 | 8/2006 | Genoa et al. | |
| 2008/0066252 A1 * | 3/2008 | Herron, Jr. | A47L 9/246 15/246.2 |
| 2008/0301903 A1 * | 12/2008 | Cunningham | A47L 9/30 15/410 |
| 2013/0106199 A1 * | 5/2013 | Forrest | H01H 9/168 307/113 |
| 2015/0135471 A1 * | 5/2015 | Cunningham | H02K 17/04 15/301 |
| 2015/0190023 A1 | 7/2015 | Nieschwitz et al. | |
| 2017/0319043 A1 | 11/2017 | Kerntopf et al. | |
| 2017/0332858 A1 | 11/2017 | Nieschwitz et al. | |
| 2017/0347849 A1 | 12/2017 | Majer | |
| 2018/0153364 A1 | 6/2018 | Nieschwitz et al. | |
| 2019/0148984 A1 * | 5/2019 | Bevelacqua | H02J 50/23 307/104 |
| 2019/0208974 A1 * | 7/2019 | Oka | A47L 9/1666 |
| 2019/0274504 A1 | 9/2019 | Christensen | |
| 2020/0100634 A1 | 4/2020 | Nieschwitz et al. | |
| 2020/0178745 A1 | 6/2020 | Nieschwitz et al. | |
| 2020/0281431 A1 | 9/2020 | Nieschwitz et al. | |
| 2021/0145226 A1 | 5/2021 | Nieschwitz et al. | |
| 2021/0196091 A1 | 7/2021 | Nieschwitz et al. | |
| 2021/0244247 A1 | 8/2021 | Nieschwitz et al. | |

* cited by examiner

VACUUM HOSE HAVING AN INTEGRATED SWITCH

CROSS REFERENCE TO RELATED APPLICATIONS

The present disclosure is a continuation-in-part of U.S. patent application Ser. No. 16/806,543, filed on Mar. 2, 2020, which claims the benefit of U.S. Provisional Application Ser. No. 62/813,278, filed on Mar. 4, 2019; the entirety of each is incorporated herein by reference.

The present disclosure is a continuation-in-part of U.S. patent application Ser. No. 16/580,165, filed on Sep. 24, 2019, which claims the benefit of U.S. Provisional Patent Application Ser. No. 62/756,140, filed Nov. 6, 2018; the entirely of each is incorporated herein by reference.

TECHNICAL FIELD

The present disclosure relates generally to a vacuum hose having the ability to effectuate one or more control signals to be sent to a transceiver in operative communication with a powered central vacuum unit. More particularly, the present disclosure relates to a switch located at or near the end of a vacuum hose that sends signals to activate or deactivate the central vacuum unit. The switch located at the end of the hose provides an improvement over other switches that are located at the valve or located on the head unit or handle that couples with the hose.

BACKGROUND

Central whole home vacuum systems typically include a powered central vacuum unit (also known as a central vacuum source), typically installed in a garage or basement. The powered central vacuum unit creates a vacuum to gather debris within a home. The debris is carried through conduits within or connected to walls of a home. The conduits terminate at one or more valves installed in one or more walls of the home. Exemplary powered central vacuum units or sources, conduits, and valves are all shown in other disclosures of the Applicant. For example, that which is shown in: US2021/0145226; U.S. Pat. Nos. 11,019,967; 10,973,382; US2021/0244247; U.S. Pat. No. 11,096,534; and US 2020/0100634, each of which is incorporated herein by reference.

A hose is connected to the valve. The hose has two ends, wherein one end of the hose is connected with the valve and the other end of the hose includes a nozzle or cuff that mates with or engages a head unit. The head unit can be powered or unpowered. Some head units include a handle. Powered head units can include rotating brushes to assist in the vacuuming or sweeping process. Unpowered head units may take on a variety of shapes, such as including bristles that assist in the vacuuming or sweeping process.

In addition to the foregoing, central whole home vacuum systems also include or are operatively connected to a transceiver configured to receive one or more wireless or wired control signal(s). The control signal(s) can activate (i.e., turn on) or deactivate (i.e., turn off) the powered central vacuum unit. The control signals are ordinarily executed or effectuated via a switch.

Currently, the switch that controls the operation of the central vacuum unit is installed in one of two locations. A first type of switch is installed or integrally formed on the valve that is within or on the wall in the home. A second type of switch is installed or integrally formed on the head unit or handle assembly, or the piece of equipment that connects to the hose. Additionally, some of these switches require the use of batteries, which have a tendency to "run out" or deplete their charge.

SUMMARY

It has been determined that installing switches in these two locations is problematic. First, when the switch is installed on the valve mounted on or in the wall, the operator may have to walk some distance from their operating location to activate or deactivate (i.e., turn on/off) the central vacuum unit. Secondly, when the switch is installed on the head unit, the operator is required to have access to the head unit, which is not always the case, to activate or deactivate the central vacuum unit. Further, when the switch is battery operated, regardless of location, there is a tendency for the batteries to lose their charge. Thus, if the batteries loses their charge, there is the possibility that the operator cannot control central vacuum unit when needed. For example, if the central vacuum unit is activated and operating when the batteries lose charge, the operator will not be able to send the control signal to deactivate (i.e., turn off) the central vacuum unit. Similarly, the operator may not be able to activate the central vacuum unit if the batteries are depleted.

The present disclosure addresses these and other issues. Namely, the present disclosure provides a switch in a new location that is different from the current state of the art. Namely, rather than placing the switch either on the valve or on the head unit, the present disclosure provides a switch that is located on the hose. In one exemplary embodiment, the present disclosure provides a hose with a switch on the hose. More particularly, one particular embodiment provides a vacuum hose having a nozzle or cuff on the distal end of the hose and the switch is located at or near the distal end of the hose. It has been found that this provides greater usability for the user as they are almost always holding or carrying the distal end of the hose.

Further, the problems of a battery operated switch are alleviated by incorporating an energy harvesting switch (i.e., battery-free or batteryless). This eliminates the problems with batteries being depleted during operation.

In one aspect, an exemplary embodiment of the present disclosure may provide a vacuum hose comprising: a hose body defining a bore adapted to vacuum debris, the hose body comprising a proximal first end and a distal second end, wherein the hose body is flexible between the first end and the second end; and a switch adjacent the second end of the hose body that selectively permits one or more control signals to be sent a transceiver in operative communication with a central vacuum unit. This exemplary embodiment may further include a cuff or nozzle coupled to or defining the second end of the hose, wherein the switch is on the cuff or nozzle. This exemplary embodiment may further include wherein the cuff or nozzle comprises: a first end of the cuff or nozzle; a second end of the cuff or nozzle; a first opening having a first diameter defined by the first end of the cuff or nozzle; a second opening having a second diameter defined by the second end of the cuff or nozzle; a sidewall extending between the first end of the cuff or nozzle and the second end of the cuff or nozzle; wherein the switch is position between the first end of the cuff or nozzle and the second end of the cuff or nozzle. This exemplary embodiment may further include wherein the first diameter being different than the second diameter. This exemplary embodiment may further include wherein the first diameter is larger than the second diameter. This exemplary embodiment may further include a concave section on the sidewall, wherein the switch is located at the concave section. This exemplary embodiment may further include a switch housing having an outer surface, wherein the switch housing is connected to the sidewall. This exemplary embodiment may further include wherein the switch is an energy harvesting switch that has no constant power source and no battery. This exemplary embodiment may further include wherein the energy harvesting switch comprises: a rocker in operative communication with a magnet, wherein movement of the rocker causes the magnet to move near a coil to create an electrical current; wherein the electrical current powers the one or more control signals to be sent to the transceiver. This exemplary embodiment may further include a slot within the switch, wherein the magnet slides within the slot in response to movement of the rocker.

In another aspect, an exemplary embodiment of the present disclosure may provide a method comprising: grasping a vacuum hose having a flexible hose body extending between a proximal first end and a distal second end; actuating a switch located near the distal second end of the hose body; effectuating one or more control signals to be sent to a transceiver operatively connected with a central vacuum unit in response to actuation of the switch, wherein the one or more control signals are adapted to activate or deactivate the central vacuum unit. This exemplary embodiment may further include actuating the switch to activate the central vacuum unit; effecting debris to travel through the hose body via vacuum; and actuating the switch to deactivate the central vacuum unit. This exemplary embodiment may further include generating a temporary electric current via actuation of the switch, wherein the switch is an energy harvesting switch that generates the temporary electric current without a dedicated power source or without a battery. This exemplary embodiment may further include moving, within the energy harvesting switch, a magnet near a coil in response to actuation of the switch. This exemplary embodiment may further include moving a rocker that is operatively connected to the magnet, wherein movement of the rocker causes movement of the magnet.

In yet another aspect, and exemplary embodiment of the present disclosure may provide a vacuum hose that has a switch to allow or permit an operator to selectively send control signals to a transceiver to control the operation of a central vacuum unit. The switch may be located on a cuff or nozzle defining a distal end of the vacuum hose. The switch is not located on a head unit that couples to the cuff or nozzle and not located on a wall-mounted valve. The switch can be an energy harvesting switch that requires no batteries or no dedicated power source (i.e., not hardwired).

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
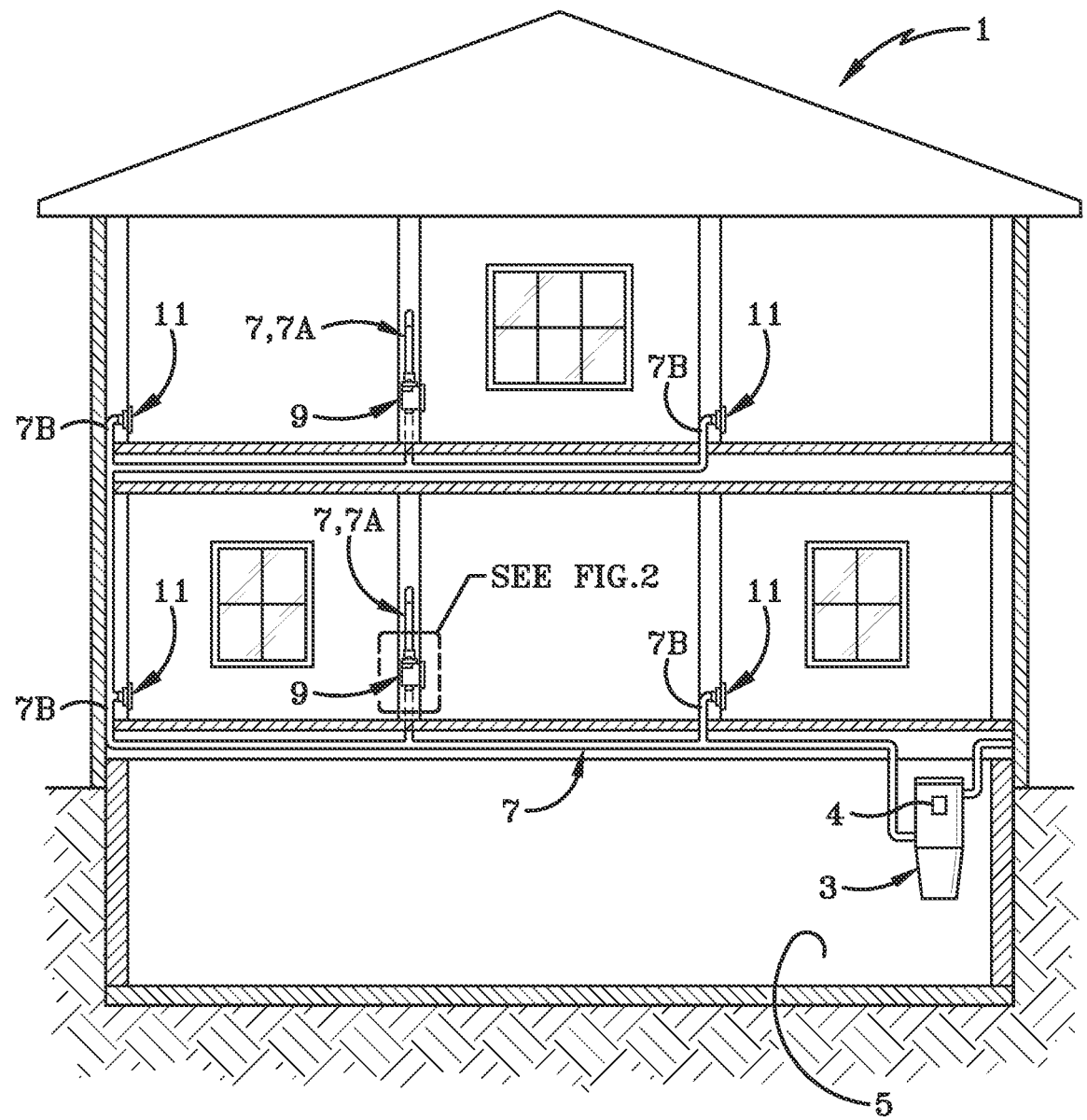
FIG. 1 is a diagrammatic view showing a structure having the improved vacuum cleaning system of the present disclosure located therein.

A central vacuum cleaning system according an exemplary embodiment of the present disclosure is indicated generally at 1 and is shown in FIG. 1. A central vacuum source 3 is located within a usual structure such as in a lower level or basement 5 of a dwelling or could be located outside closely adjacent thereto, such as in a garage. A plurality of vacuum source tubes or conduits 7 extend from vacuum source 3 to various locations or rooms within the structure. The number of conduits will depend upon the size of the house, number of rooms, size of the vacuum source, and other factors. These vacuum supply conduits are usually formed of rigid plastic and in accordance with the present disclosure include a conduit 7A connected to a primary inlet valve indicated generally at 9, and by conduits 7B to a pair of secondary inlet valves indicated generally at 11, two of which are shown in FIG. 1 in the first floor of the dwelling and two in the top floor. Primary inlet valve 9 is shown mounted within a structure and connected to central vacuum source 3 by conduit 7A within wall 17. Inlet valve 9 is shown attached to a wall stud 15 (FIG. 2) and accessible through an opening 16 formed in an attached wallboard 17 such as drywall, used in a usual home construction. System 1 may further include a plurality of secondary inlet valves 11 located throughout the structure. Primary inlet valve 9, as well as secondary inlet valves 11, can be used in various types of constructions and other structure locations than that shown in FIG. 1 within in the concept of the present disclosure.

Figure 2:
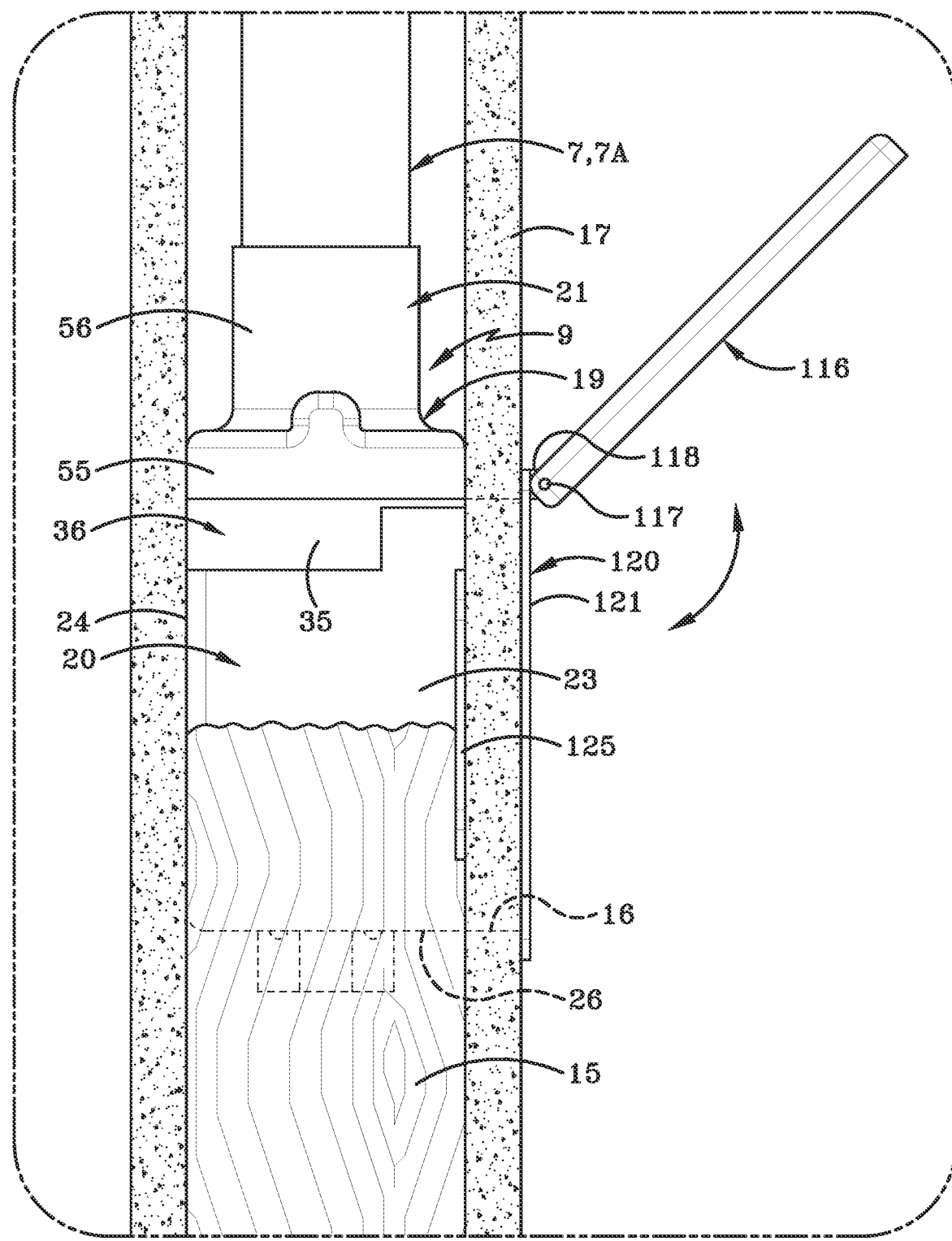
FIG. 2 is an enlarged view of the encircled portion labeled "SEE FIG. 2" in FIG. 1 showing the principal inlet valve of the vacuum cleaning system with portions broken away mounted in a wall opening with the closure door in an open position.

As depicted in FIG. 2, primary inlet valve 9 includes a main body or housing indicated generally at 19, formed by a lower portion 20 and an upper portion 21. Lower portion 20 is formed by a pair of side walls 23, a rear wall 24, a top wall (not shown) and a bottom wall 26, which walls define an internal chamber 27 having a front or outlet end opening and an open top. Lower portion 20 preferably will have a rectangular shape. In one exemplary embodiment, the lower portion 20 is defines an unsealed housing that is open to the environment. Since the lower portion is unsealed, certain aspects of the hose may seal directly with the interior surface of the conduit 7 and may seal directly with a ball seal carried by the lower portion 20.

Upper portion 21 of housing 19 includes a box top which is mounted on and encloses open top of lower portion 20. The upper edges of side walls 23 of lower portion 20 are formed with U-shaped channels which slidably receives therein complementary-shaped channels formed along sidewalls of a lower rectangular-shaped bottom portion 36 of box top to mount upper portion 21 on lower portion 20. This sliding engagement enables lower portion 20 and upper portion 21 of housing 19 to be produced independently preferably of a molded plastic, and then assembled after the various internal components thereof are mounted respectively in lower portion 20 and upper portion 21.

Box top, in addition to having a lower rectangular portion 36, includes a cylindrical intermediate portion 55 which is connected to an upper reduced diameter cylindrical top portion 56 by a horizontal annular portion providing a bell-shaped configuration to box top. Box top is formed with a hollow interior which terminates in a top opening. Box top preferably will be a one-piece molded plastic member as are portions 20 and 21 of housing 19. The hollow interiors of lower portion 20 and box top provide a through bore for inlet valve 9 which terminates in an inner open end defined by top opening and an outer open end defined by front wall opening of body 19 for the passage of a flexible hose therethrough.

A length of a usual type of a flexible vacuum cleaning hose 65 may be slidably mounted within the interior of conduit 7A and has a proximal first end and a distal second on which is mounted cuff or nozzle handle. In one particular embodiment, the proximal first end includes a cuff that is a type of hose cuff identified in a related disclosure commonly owned by the Applicant at the time of filing and is the subject of U.S. patent application Ser. No. 15/886,319 filed on Feb. 1, 2018, the entirety of which is incorporated by reference as if fully rewritten. Notably, the hose cuff in the other disclosure may sometime be referred to as a hose plug, but the nomenclature is synonymous. As such, hose cuff at the first end may include inter alia a hose cuff for connection with a vacuum hose conduit comprising: a first end opposite a second end defining a longitudinal direction therebetween; a longitudinal axis extending from the first end to the second end; a first cylindrical wall defining an annular channel extending at least partially circumferentially around the longitudinal axis; a first cam adjacent the annular channel adapted to release a button from a position near the cylindrical wall; a first slot formed in the first cylindrical wall in communication with the annular channel, wherein the first slot is adapted to receive the button therein. This hose cuff may further include wherein the first slot is orthogonal to the annular channel. This hose cuff may further include a ledge defining a portion of the first slot, wherein the ledge is longitudinally aligned with the first cam. This hose cuff may further include a first sloped wall orthogonal to the ledge; a second sloped wall spaced from the first sloped wall and orthogonal to the ledge; and wherein the first slot is defined between the first sloped wall and the second sloped wall. This hose cuff may further include a second cylindrical wall extending towards the second end of the hose cuff from the annular channel, wherein the second cylindrical wall has a larger radius than the first cylindrical wall; wherein the first sloped wall extends between the first cylindrical wall and the second cylindrical wall; and wherein the first sloped wall extends between the first cylindrical wall and the second cylindrical wall. This hose cuff may further include wherein the first sloped wall is curved and the second sloped wall is curved. This hose cuff may further include wherein the first sloped wall has a flat slope and the second sloped has a flat slope. This hose cuff may further include wherein a portion of the annular channel that extends continuously below the first cam. This hose cuff may further include wherein the portion of the annular channel below the first cam is in open communication with the first slot that is longitudinally aligned with the first cam adapted to allow the button to bypass the first cam and slide down into the first slot by crossing through the portion of the annular channel below the first cam. This hose cuff may further include a sloped wall on the first cam extending between the cylindrical wall and an outer apex on the first cam, wherein the apex is adapted to depress the button. This hose cuff may further include wherein the sloped wall on the first cam is curved.

The other edges of housing side walls 23, of bottom wall 26, and of top wall 25 form front end opening or port through which nozzle handle and hose 65 extend from for performing a debris pickup cleaning operation and then retracted into the housing for subsequent storage in interior chamber 27 of housing 19. Preferably, an outer closure door 116 is pivotally mounted at the upper end of lower portion 20 of housing 19 at the junction with the box top for opening and closing front end opening in order to conceal interior chamber of lower portion 20 and to provide an attractive faceplate for inlet valve 9 when mounted on wall stud 15 or other support structure. Door 116 is pivotally mounted with respect to housing 19 by a pivot pin 117 which extends through a flange 118 formed on and extending outwardly from a door mounting frame indicated generally at 120. Door mounting frame 120 has a rectangular outer frame 121 and a rectangular inner frame 122 which defines a rectangular opening. An inner frame extends perpendicularly from outer flange 121. Door frame 120 is adjustably mounted on lower portion 20 of housing 19 by inner frame forming a sliding friction fit with the interior surfaces of side walls 23, bottom wall 26 and top wall as compensate for different thicknesses of wall 17. Door frame 120 is secured to housing 19 by a plurality of fasteners which extend through preformed holes formed in the corners of lower portion 20. Door frame 120 and door 116 are optional and the lower portion 20 is functionally operable without a door.

One or more mounting flanges 125 are formed integrally with or attached to one or both side walls 23 of lower portion 20 and extend outwardly therefrom for mounting inlet valve 9 to wall stud 15, wall 17, or other support structure, which could be the aluminum or wood studs of a building, a concrete wall or other type of material from which the structure is formed. Door 116, door frame 120, mounting flanges 125 and housing 19 can be formed of various materials such as of a rigid molded plastic or various other types of metal materials without affecting the concept of the invention. One exemplary prior art type of electrical switch was mounted within or near lower portion of housing 19 so that it engaged nozzle end of the hose when the handle is in its stored position to turn off vacuum source 3, and which will turn vacuum source 3 on when the handle has been removed for a cleaning operation.

Figure 3:
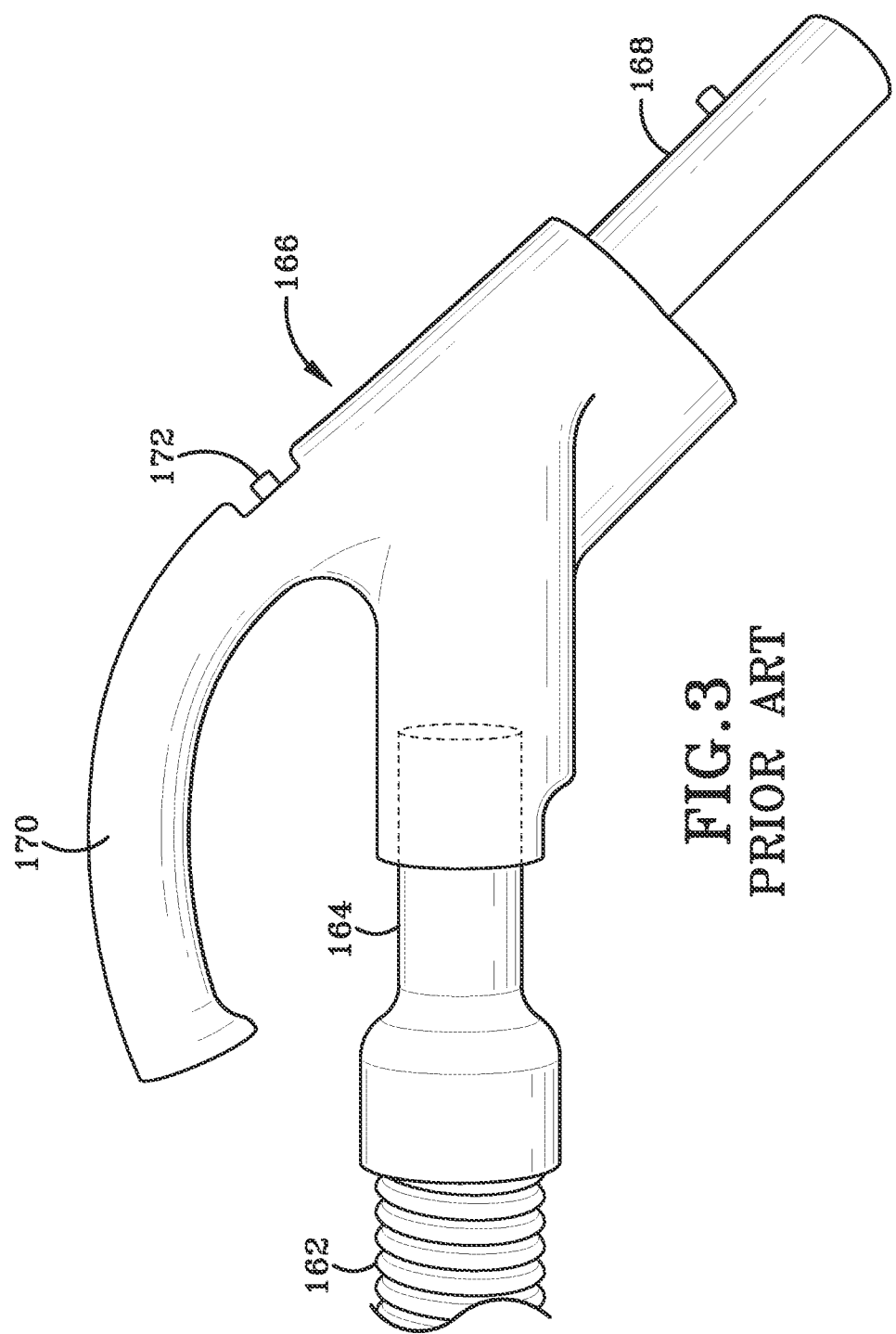
FIG. 3 is a side view of a prior art vacuum handle having a switch.
Figure 4:
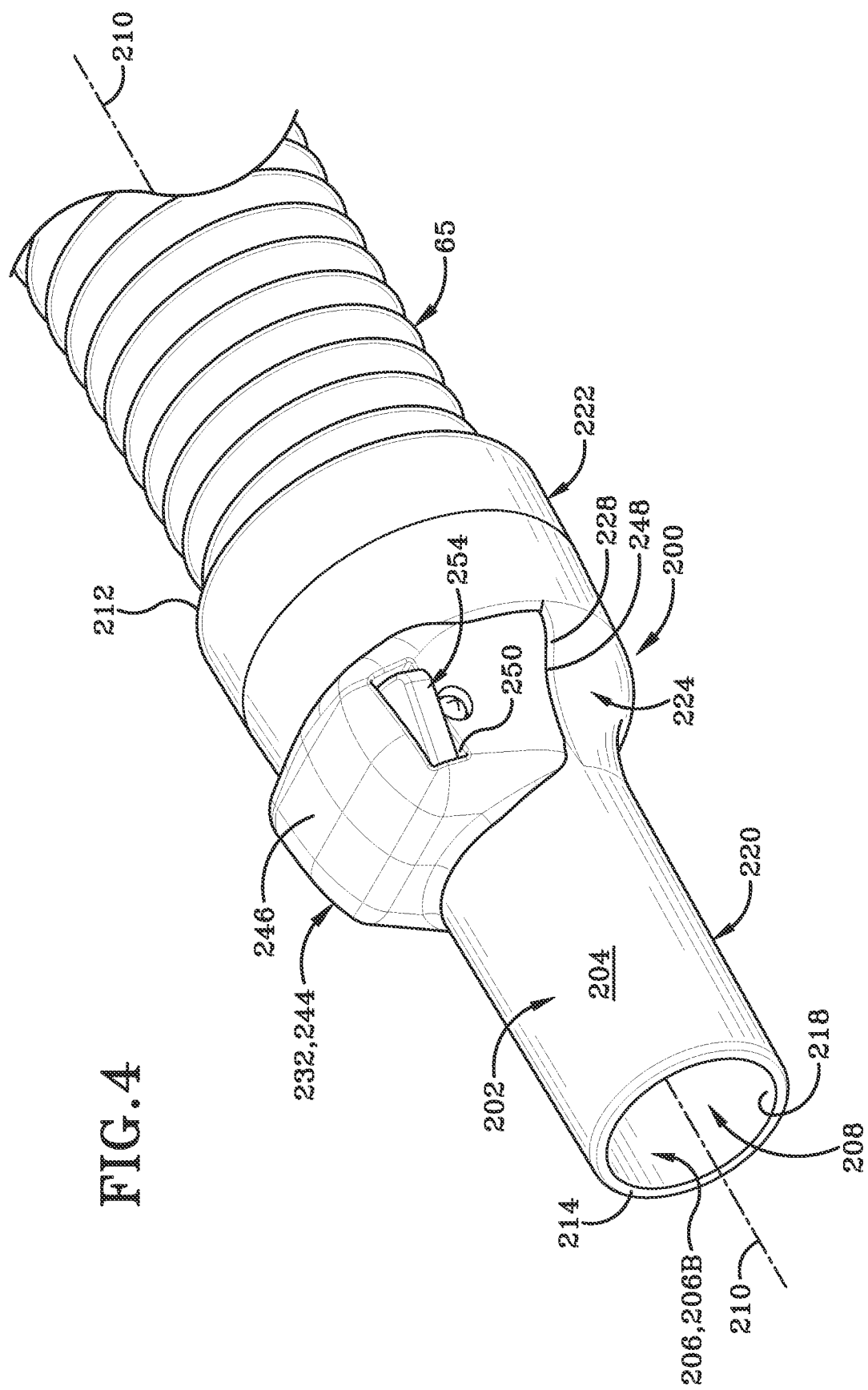
FIG. 4 is a top perspective view of a nozzle on a vacuum hose having a switch according to one aspect of the present disclosure.
Figure 5:
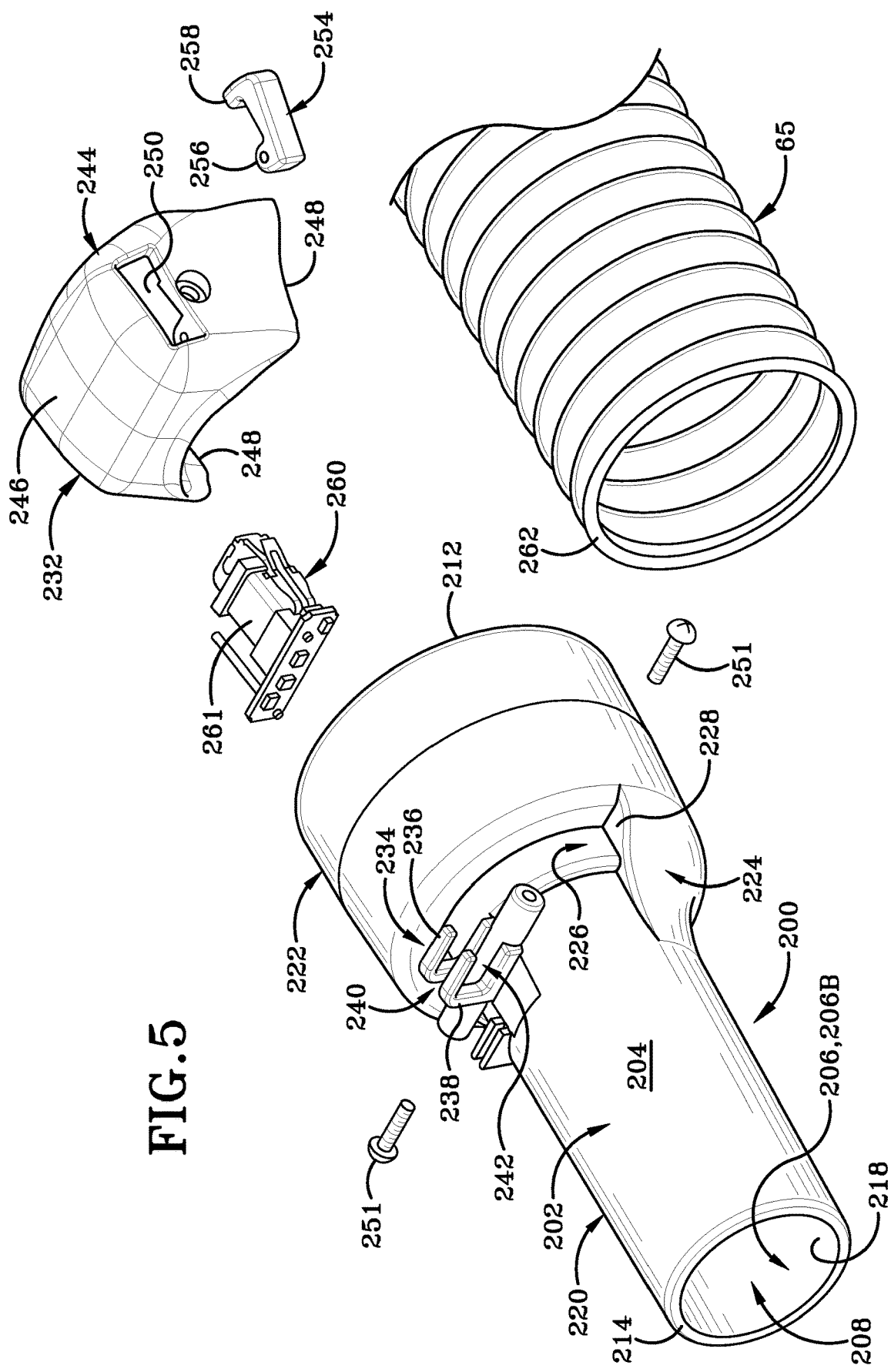
FIG. 5 is an exploded perspective view of the nozzle, vacuum hose, and the switch.
Figure 6:
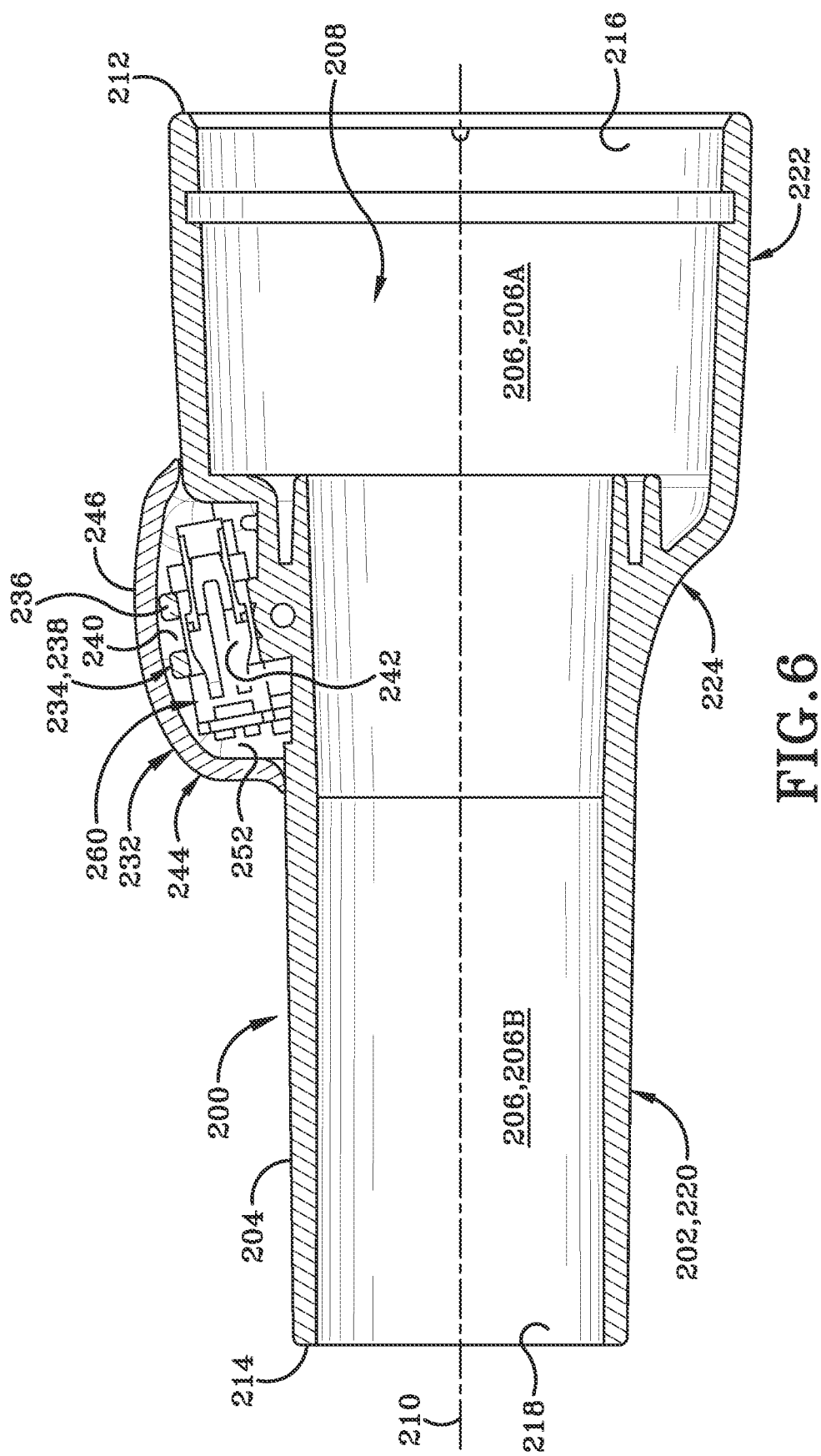
FIG. 6 is a longitudinal cross section view of the nozzle on the vacuum hose having the switch.
Figure 7:
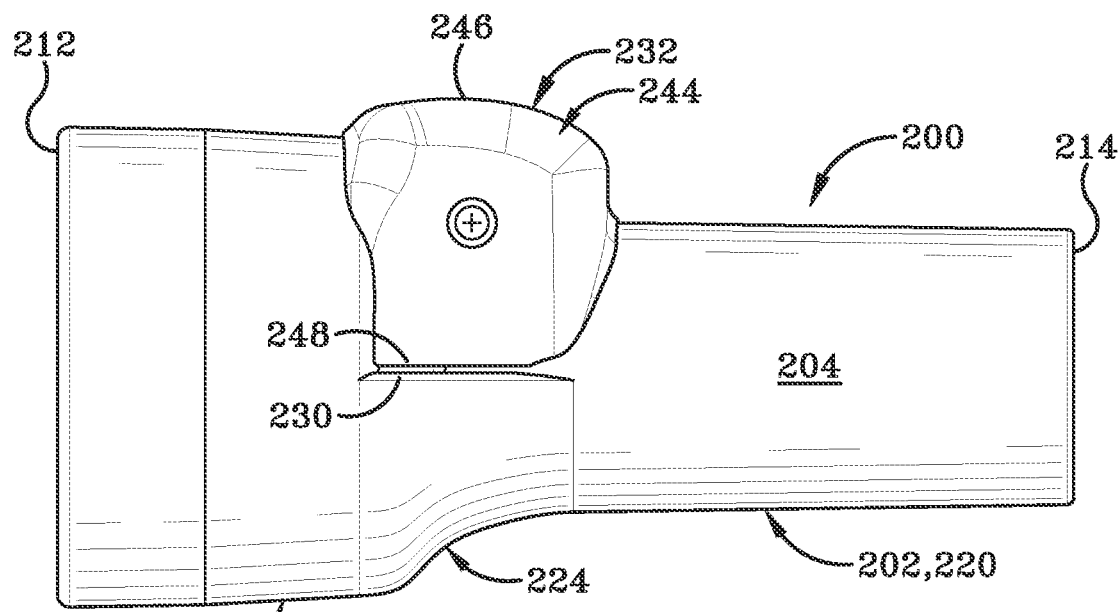
FIG. 7 is a first side elevation view of the nozzle on the vacuum hose having the switch.
Figure 8:
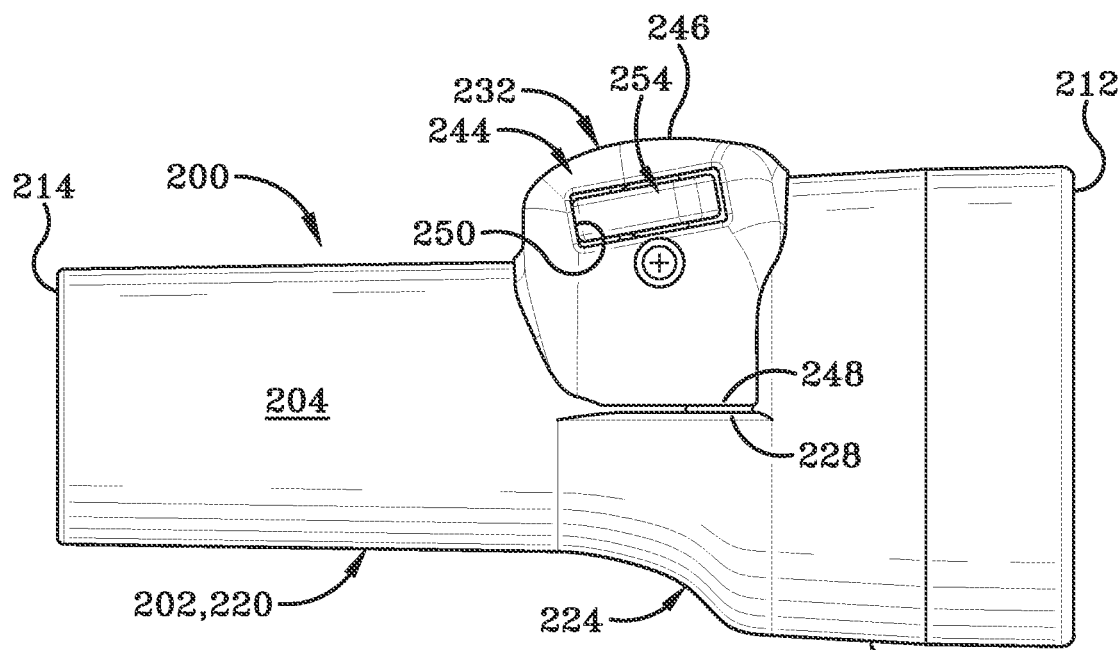
FIG. 8 is a second side elevation view of the nozzle on the vacuum hose having the switch.
Figure 9:
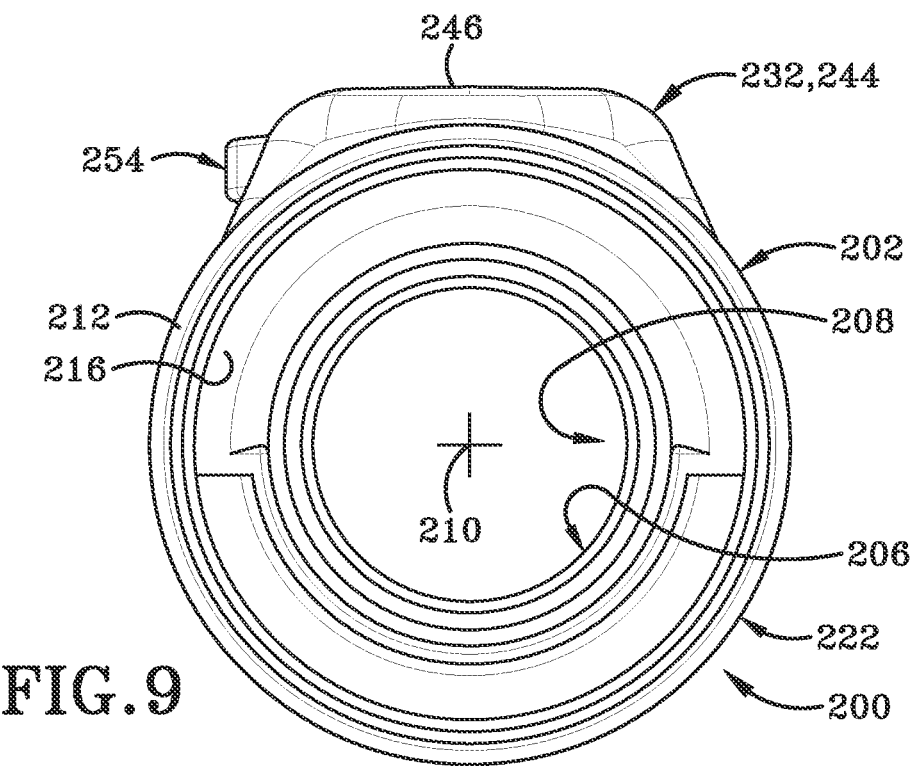
FIG. 9 is a first end elevation view of the nozzle on the vacuum hose having the switch.
Figure 10:
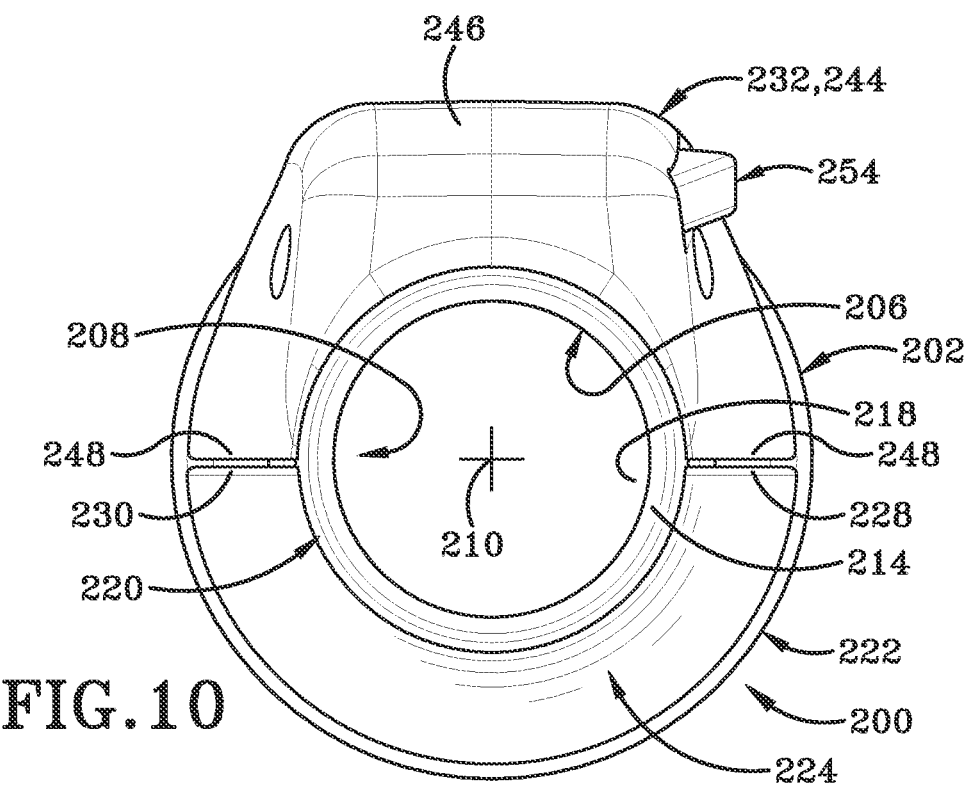
FIG. 10 is a second end elevation view of the nozzle on the vacuum hose having the switch.

FIG. 3 depicts a PRIOR ART embodiment of a hose assembly for use with a central vacuum system that includes an RF system. In this embodiment, the hose assembly includes a hose 162 connected to a standard nozzle 164 and a hose cuff at the other end of the hose. When the hose cuff is inserted into an inlet valve of a central vacuum system, such as valve 7 or valve 9, the nozzle 164 is in open communication with the central vacuum source 3. Furthermore, the nozzle 164 is removably connected to a handle assembly 166. The handle assembly 166 includes a handle nozzle 168 and a handle 170. When the handle assembly 166 is connected to the nozzle 164, the handle nozzle 168 is in open communication with the central vacuum source 3. Accordingly, when the central vacuum system is in operation, a user may guide the handle nozzle 168 via the handle 170 in order to uptake dirt and debris from a surface. Additionally, handle assembly 166 may releasably connect with a head unit, such as a powered brush or an un-powered item, each of which may include bristles that assist with sweeping, vacuuming or debris removal. The handle assembly 166 further includes an RF transmitter that is in wireless communication with an RF transceiver 4 of the central vacuum cleaning system 1. The RF transmitter is connected to a switch 172 of the handle assembly 166. When the switch 172 is engaged by the user, the switch 172 causes the RF transmitter of the handle assembly 166 to send a signal to the RF transceiver 4 of the central vacuum cleaning system 1 to toggle a state of the central vacuum cleaning system (i.e., from off to on or on to off). In one example, a user may insert the hose cuff into the valve 7 or 9. When in this position, a user may engage the switch 172 a first time to toggle the central vacuum system from off to on. After the user has completed vacuuming an area, the user may engage the switch 172 a second time to toggle the central vacuum system from on to off.

However, as discussed previously, the PRIOR ART configuration of FIG. 3 is not without fault. Namely, if the user does not have access to the handle assembly 166 containing switch 172, then it limits the functionality of the central vacuum system 1 by reducing or frustrating the user's ability to control the vacuum unit or source 3. The following paragraphs address these shortcomings by incorporating a switch that communicates or effectuates control signal communication with the transceiver 4 coupled with source 3.

FIGS. 4-10 depict a nozzle 200 according to an aspect of the present disclosure. Nozzle 200 may have a cylindrical elongated end which terminates in a debris pickup end opening 218. One end flares outwardly into a cylindrical hose attachment end 212. There are alternative connections of the attachment end to the hose. In one example, the nozzle is secured to the hose by an adhesive or a threaded attachment or other type of securement means. A different, and preferred attachment, may connect the hose and nozzle through a swivel attachment that enables the nozzle 200 to rotate relative to the hose 65 during operation. In one particular embodiment, the swivel connection between nozzle 200 and hose 65 may be accomplished without the use of an O-ring between the nozzle and the hose. Rather, a seal may be created based on a complementary mating fit of a flange and a recess that seals closed from vacuum suction forces originating from the source 3. Hose 65 is of a usual construction used for central vacuum cleaning systems and has sufficient flexibility to move into and out of inlet valve 9 and around bends in the conduit when manipulated by an individual during use and which slides easily along the interior of conduit 7A. Hose 65 can be the type which is non-extendable or stretchable as used in many types of vacuum cleaning systems within the concept of the present disclosure. Additionally, the hose 65 may have spiraled flights formed in the outer surface thereof.

The nozzle 200 includes a nozzle body 202 having an exterior surface 204 and an interior surface 206. The interior surface defines an inner bore 208 centered along a longitudinal axis 210 associated with the nozzle 200. The longitudinal axis 210 extends centrally through the nozzle 200. The nozzle 200 includes a proximal first end 212 and a distal second end 214. The proximal first end 212 defines an opening 216 and the second end 214 defines a second opening 218. First opening 216 is in open fluid communication with bore 208 and second opening 218 is in open fluid communication with bore 208 such that bore 208 extends fully through the nozzle body 202 between first end 212 and second end 214. The first opening 216 has a first diameter measured centrally through the longitudinal axis 210. The second opening 218 has a second diameter measured centrally through the longitudinal axis 210. The dimension of the first diameter associated with the first opening is different than the dimension of the second diameter associated with the second opening 218. In one particular embodiment, the first diameter of the first opening 216 is greater or larger than the second diameter of the second opening 218. Based on this configuration, the interior surface 206 of the nozzle body 202 may include a proximal interior surface 206A and a distal interior surface 206B wherein the distal interior surface 206B is narrower in diameter than the proximal wide interior surface 206A.

The exterior surface 204 of nozzle body 202 includes a distal section 220 and a proximal section 222. The distal section 220 has a smaller diameter measured through the longitudinal axis 210 compared to the proximal section 222. An intermediate section 224 is located between the distal section and the proximal section. The intermediate section 224 transitions the outer surface smoothly and in an uninterrupted manner between the distal section 220 and the proximal section 222. In one particular embodiment, the intermediate section 224 is a smooth concave surface extending between the distal section 220 and the proximal section 222. Relative to the longitudinal axis, the intermediate section 224 is circumferentially interrupted so as to define a receiving region 226 defined between perimeter ends 228, 230 of the intermediate section 224. In one particular embodiment, the intermediate section 224 extends 180 degrees around the longitudinal axis such that the perimeter ends 228 are coplanar with each other and intersect the same transverse plane extending through the longitudinal axis. As will be described in greater detail below, a switch cover 232 resides or is positioned in the receiving region 226 and houses a switch 260, more particularly, an energy harvesting switch, for wireless operative control of signals to be sent to the transceiver 4 in communication with the central vacuum system 1.

Within the receiving region 226, there is a switch mount 234. The switch mount 234 may take any shape or structural configuration so as to retain the switch 260 covered by or housed within switch cover 232. In one shown embodiment, the switch mount 234 is formed by a pair of radially extending hooks that provide a frictional interference fit or snap engage with the switch circuitry. More particularly, the switch mount 234 may include a first hook 236 and a second hook 238 that define a gap 240 therebetween. The first and second hooks 236, 238 define a switch receiving space 242 that allow a switch to be received between the two spaced apart hooks and engage the same for retaining the switch in the desired position.

Connected to the nozzle body 202 is the switch cover 232 having a cover body 244 defining a convex top 246. Opposite the convex top 246 is an end 248 defining the bottom of the cover 232. The bottom or end 248 mates with or connects with the perimeter ends 228, 230 of the intermediate section 224. A portion of the exterior surface of the cover body 244 may be shaped complementary to the concave curvature of intermediate section 224. Cover body 244 additionally defines a transversely extending opening 250 that is in open communication with the interior cavity 252 defined by cover body 244. Opening 250 is sized to receive a rocker or toggle 254 therein. The toggle 254 is operatively connected with switch 260. In one particular embodiment, rocker or toggle 254 includes an end 256 that is pivotally connected with switch 260 to allow another end 258 to move relative to the pivot to move or otherwise depress a component of switch 260 to permit operation of said switch 260. Switch is located at the concave intermediate section 224 on the sidewall. Stated otherwise, a transverse plane that intersects the longitudinal axis 210 will intersect both the switch 260 and the concave intermediate section 224.

Cover body 244 is shown throughout the figures as including other apertures configured to receive screws 251 therethrough for attaching the cover body 244 to the nozzle body 202. However, it is to be understood that any means of fastening the switch cover 232, namely, the cover body 244, to the nozzle body 202 are entirely possible.

The switch 260 resides within the switch receiving space 242 of the first and second hooks 236, 238 of the switch mount 234. When the switch 260 is installed on the switch mount 234, the switch 260 is covered by the switch cover 232. With the switch 260 installed on the switch mount 234, the rocker 254 is operatively connected with switch 260 and extends outwardly through opening 250 to allow the operator to depress, actuate, or otherwise manipulate rocker 254 to control switch 260. When assembled, the nozzle 200 defines a nozzle having the integrated switch 260. The nozzle 200 is installed on the distal second end 262 of hose 65.

Switch 260 adjacent the second end or distal second end 262 of hose 65 selectively permits one or more control signals to be sent the transceiver 4 in operative communication with a central vacuum unit 3. Thus, switch 260 being located at the end of the hose 65 or on nozzle 200 enables greater user functionality and control of system 1 as the nozzle 200 or distal second end 262 is ordinarily always held by the user because previous switches were either located on the valve 7 or the handle 166 of the head unit In one specific example, switch 260 is embodied as an energy harvesting switch. As an energy harvesting switch, there are no batteries and no constant power source connected to the switch 260 (i.e., hardwired). Rather, the switch 260 is able to generate its own self-contained power through electromechanical energy generated in response to movement of rocker 254, or through movement of another physical element on switch 260. For example, the rocker 254 may be in operative communication with a magnet, wherein movement of the rocker causes the magnet to move near a coil to create a temporary or momentary electrical current. Then, this temporary or momentary electrical current powers the one or more control signals to be sent to the transceiver 4 to operate the central vacuum unit 3.

Another exemplary energy harvesting switch 260 utilizes piezoelectric energy harvesting (PEH) to generate a momentary or temporary electric current. PEH can scavenge energy from the ambient vibration sources. With its electromechanical coupling characteristic, a piezoelectric element can generate electricity when strain is produced. Since the deformation in a vibrating structure is alternating, the generated electricity is also alternating. In some implementations, an interface circuit may be needed for ac-dc conversion. Alternatively, a standard energy harvesting (SEH) interface circuit involves only a bridge rectifier for the ac-dc conversion.

Given a typical PEH device, e.g., a piezoelectric cantilever with harvesting interface circuit and energy storage, the piezoelectric structure can be modeled as an equivalent current source $i_{eq}$ in parallel with the piezoelectric clamped capacitance $C_p$ and the internal leakage resistance $R_p$. The current source $i_{eq}$ is proportional to the vibration velocity $\dot{x}$ with the relation of:

$$i_{eq}(t) = \alpha_e \dot{x}(t)$$

Where $\alpha_e$ is the force-voltage factor of the piezoelectric structure.

Different interface circuits could be designed for different objectives; yet, in terms of energy flow, they all extract energy from the vibrating mechanical structure. For the purpose of vibration suppression, usually the extracted energy is dissipated, while for energy harvesting, a portion of the extracted energy is reclaimed and stored in electrical form for the subsequent usage of sending the control signals from the switch 260 to the transceiver 4.

Having thus described the construction of system 1, with particular reference to nozzle 200 having the switch 260 near the distal end of the hose 65, reference will be made to its operation.

System 1 enables a user to easily grasp the vacuum hose 65 having a flexible hose body extending between a proximal first end and a distal second end. Inasmuch as the switch 260 is located on the nozzle 200 adjacent the distal second end of the hose body, as detailed herein, a user actuates the switch 260 thereon. Then, the switch effectuates or otherwise causes one or more control signals to be sent to the transceiver 4 operatively connected with a central vacuum unit 3 in response to actuation of the switch 260. The one or more control signals are adapted to activate or deactivate the central vacuum unit 3. The user may move the rocker 254 on or coupled to the switch 254 operatively connected to the hose nozzle between first and second ends of the hose nozzle.

The actuation of switch 260 then activates the central vacuum unit 3. This creates a vacuum to be created in the hose 65. Then, the user can use maneuver the hose to pick up debris. The vacuum within hose 65 effects debris to travel through the hose bod. Then, when the vacuum process is complete or a user-selected satisfactory amount of debris has been picked up, the user actuates the switch 260 to deactivate the central vacuum unit 3.

As stated previously, one version of switch 260 is an energy harvesting switch such that no batteries or constant power source is necessary. As such, the energy harvesting switch generates a temporary electric current via actuation of an element on the switch 260. In one example, a first element of the energy harvesting switch is moved next to a second element of the energy harvesting switch in response to actuation of the switch. More particularly, a user moves the rocker 254 on the switch 260. Portions of the switch 260 are operatively coupled to the rocker 254 that enable them to generate a temporary or momentary electrical current in response to moving the rocker. In one example, the rocker is operatively coupled to a vibration element 261, such that movement of the rocker causes the vibration element to vibrate within the switch 260 on the nozzle 200. Then, an extraction element may extract energy from the vibrating element. Then, the extracted energy may be reclaimed, by a reclaiming element, and temporarily stored, by a short-life energy storage element, for subsequent usage to provide power for sending the control signals from the switch 260 to the transceiver 4 on central vacuum unit 3 to activate and deactivate the same.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "element A and/or element B", when used in conjunction with open-ended language such as "comprising" can refer, in one embodiment, to element A only (optionally including elements other than element B); in another embodiment, to element B only (optionally including elements other than element A); in yet another embodiment, to both element A and element B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A vacuum hose comprising:
a hose body defining a bore adapted to vacuum debris, the hose body comprising a proximal first end and a distal second end, wherein the hose body is flexible between the first end and the second end;
a switch that is covered by a switch cover, the switch cover having a convexly curved outer surface, and wherein the switch selectively permits one or more control signals to be sent to a transceiver in operative communication with a central vacuum unit, wherein the switch is actuated to activate or deactivate the central vacuum unit from an on or off state;
two parallel hooks which define a gap, wherein the switch is fixedly mounted to the two parallel hooks and retained within the gap, wherein the two parallel hooks are covered by the switch cover, wherein the switch cover defines an opening that extends fully through the convexly curved outer surface;
a rocker on the switch that extends through the opening in the switch cover;
a cuff or nozzle coupled to the distal second end of the hose body;
a first end of the cuff or nozzle;
a second end of the cuff or nozzle;
a first opening having a first diameter defined by the first end of the cuff or nozzle, wherein the first end of the cuff or nozzle is connected with the distal second end of the hose body;
a second opening having a second diameter defined by the second end of the cuff or nozzle, wherein the first diameter is larger than the second diameter;
an intermediate section of the cuff or nozzle comprising a concave surface positioned between the first end of the cuff or nozzle and the second end of the cuff or nozzle; and
wherein the switch is fixed in position, via the two parallel hooks, at the concave surface of the intermediate section, and the convexly curved outer surface of the switch cover is connected with the concave surface of the intermediate section.

2. The vacuum hose of claim 1, wherein the switch is an energy harvesting switch that has no constant power source and no battery.

3. The vacuum hose of claim 2,
wherein movement of the rocker effectuates a temporary or momentary electrical current to be created in the energy harvesting switch;
wherein the electrical current powers the one or more control signals to be sent to the transceiver.

4. The vacuum hose of claim 3, further comprising:
a vibration element of the switch that moves in response to movement of the rocker;
an energy extractor in the switch to reclaim energy from the vibration element within the switch, wherein the reclaimed energy is used to generate the electrical current that provides power for the one or more control signals to be sent to the transceiver.

5. The vacuum hose of claim 1, wherein the switch cover is located at the concave surface of the intermediate section.

6. A method comprising:
grasping a vacuum hose having a flexible hose body extending between a proximal first end and a distal second end, wherein a hose nozzle is coupled to the distal second end;
actuating an integrated switch located in a fixed position on the hose nozzle, wherein the hose nozzle is coupled to the distal second end of the hose body, wherein actuating the switch is accomplished by moving a rocker coupled to the switch, wherein the switch is located between first and second ends of the hose nozzle at an intermediate section of the hose nozzle, and the switch is covered by a switch cover having a convexly curved outer surface, wherein a portion of the switch cover is shaped complementary to peripheral ends of the intermediate section of the hose nozzle, wherein the intermediate section is concavely curved, and the switch cover is connected with the peripheral ends of the intermediate section;
moving the rocker when the switch is retained by two parallel hooks that are covered by the switch cover; and
effectuating one or more control signals to be sent to a transceiver operatively connected with a central vacuum unit in response to actuation of the switch, wherein the one or more control signals are adapted to activate or deactivate the central vacuum unit.

7. The method of claim 6, further comprising:
actuating the switch to activate the central vacuum unit;
effecting debris to travel through the hose body via vacuum; and
actuating the switch to deactivate the central vacuum unit.

8. The method of claim 6, further comprising:
generating a temporary electric current via actuation of the switch, wherein the switch is an energy harvesting switch that generates the temporary electric current without a dedicated power source or without a battery.

9. The method of claim 8, further comprising:
moving, within the energy harvesting switch, the rocker of the energy harvesting switch next to a vibration element of the energy harvesting switch in response to actuation of the switch.

10. The method of claim 9, further comprising:
generating a temporary or momentary electrical current in response to moving the rocker.

11. The method of claim 10, further comprising:
vibrating the vibration element in the energy harvesting switch;
wherein the energy harvesting switch is configured to extract energy from the vibration element.

12. The method of claim 11, further comprising:
reclaiming and temporarily storing electrical energy for subsequent usage to send the control signals from the switch to the transceiver.

13. A vacuum hose comprising:
a hose body defining a bore adapted to vacuum debris, the hose body comprising a proximal first end and a distal second end, wherein the hose body is flexible between the proximal first end and the distal second end;
a nozzle at the distal second end of the hose body;
an intermediate section of the nozzle comprising a concave surface positioned between a first end and a second end of the nozzle, wherein the intermediate section transitions an outer surface of the nozzle smoothly between the first end of the nozzle that is wider than the second end of the nozzle;
wherein the intermediate section is at least partially interrupted about an axis to define a receiving region between perimeter ends of the intermediate section;
wherein the concave surface of the intermediate section extends 180 degrees around the axis such that the perimeter ends are coplanar with each other;
two parallel hooks which define a gap, wherein the two parallel hooks are located in the receiving region of the nozzle, wherein the two parallel hooks are covered by a switch cover, wherein the switch cover defines an opening that extends fully through an outer surface of the switch cover; and
a switch retained in a fixed position, via at the least two parallel hooks in the receiving region between the perimeter ends of the intermediate section, and a rocker on the switch that extends through the opening in the switch cover.

* * * * *